(12) United States Patent  
Hernandez

(10) Patent No.: US 7,506,456 B2  
(45) Date of Patent: Mar. 24, 2009

(54) RULE ASSEMBLY

(75) Inventor: Hector Ray Hernandez, Fullerton, CA (US)

(73) Assignee: Alltrade Tools LLC, Long Beach, CA (US)

( * ) Notice: Subject to any disclaimer, the term of this patent is extended or adjusted under 35 U.S.C. 154(b) by 0 days.

(21) Appl. No.: 11/523,310

(22) Filed: Sep. 19, 2006

(65) Prior Publication Data

US 2008/0066333 A1    Mar. 20, 2008

(51) Int. Cl.
*G01B 3/10* (2006.01)
(52) U.S. Cl. ............................... 33/755; 33/759; 33/770
(58) Field of Classification Search ............. 33/755, 33/759–761, 765, 769–770
See application file for complete search history.

(56) References Cited

U.S. PATENT DOCUMENTS

| | | | |
|---|---|---|---|
| 4,583,294 A | | 4/1986 | Hutchins et al. |
| 4,619,020 A | | 10/1986 | Lecher, Sr. |
| D375,269 S | | 11/1996 | Wertheim et al. |
| 5,711,085 A | * | 1/1998 | Adams ........................ 33/768 |
| 6,032,380 A | | 3/2000 | Li |
| 6,243,964 B1 | | 6/2001 | Murray |
| 6,256,901 B1 | | 7/2001 | Lin |
| 6,449,866 B1 | | 9/2002 | Murray |
| D464,579 S | | 10/2002 | Martone |
| 6,490,809 B1 | | 12/2002 | Li |
| 6,643,948 B1 | | 11/2003 | Seymour |
| 6,662,463 B2 | | 12/2003 | Lee |
| 6,718,649 B1 | | 4/2004 | Critelli et al. |
| 6,931,753 B2 | | 8/2005 | Ryals et al. |
| 7,065,895 B2 | * | 6/2006 | Hoopengarner ............... 33/760 |
| 2007/0180726 A1 | * | 8/2007 | Harrell ......................... 33/760 |

* cited by examiner

*Primary Examiner*—Yaritza Guadalupe-McCall
(74) *Attorney, Agent, or Firm*—Fulwider Patton LLP

(57) ABSTRACT

A rule assembly is described providing novel and beneficial features to the user. In a first aspect of the invention, an improved device and method is described for removably attaching the rule assembly housing to the clothing or equipment of a user. A beam is provided with a first and a second end, each end being connected to the housing to define a space sufficient to permit the introduction of a retention element for suspending the rule assembly. Preferably, the beam may pivot at the first end, and may be detachably lockable to the housing at the second end. In another aspect of the invention, means for making a preliminary determination as to the cause of any malfunction within the housing of the rule assembly is described. The housing of the rule assembly is provided with a window sealed with transparent material. A reel within the housing that carries a tape blade and a retraction spring is provided with at least one opening. The user may view the blade and/or the retraction spring from the exterior of the housing, through the transparent material and through the reel opening to assess its condition in the event of a malfunction.

2 Claims, 6 Drawing Sheets

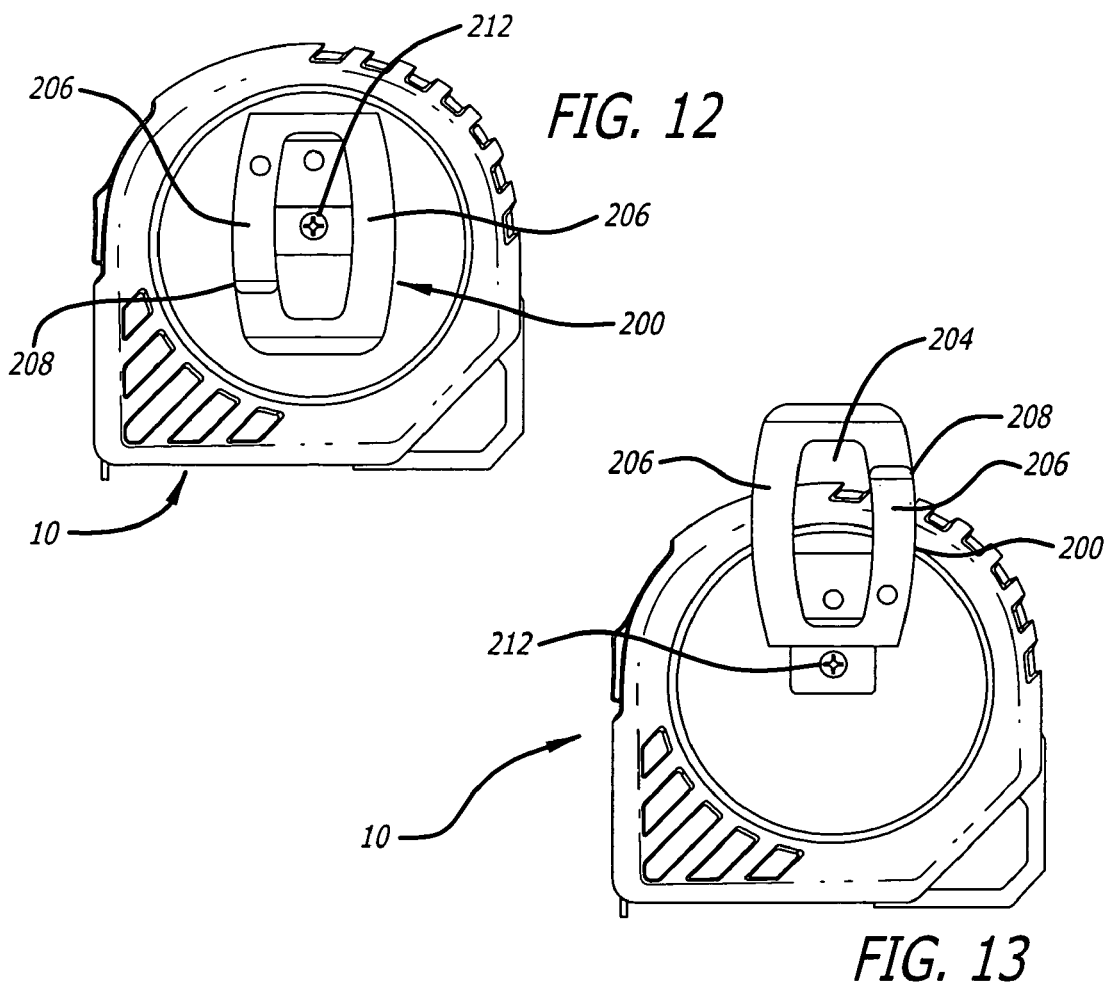
FIG. 12
FIG. 13
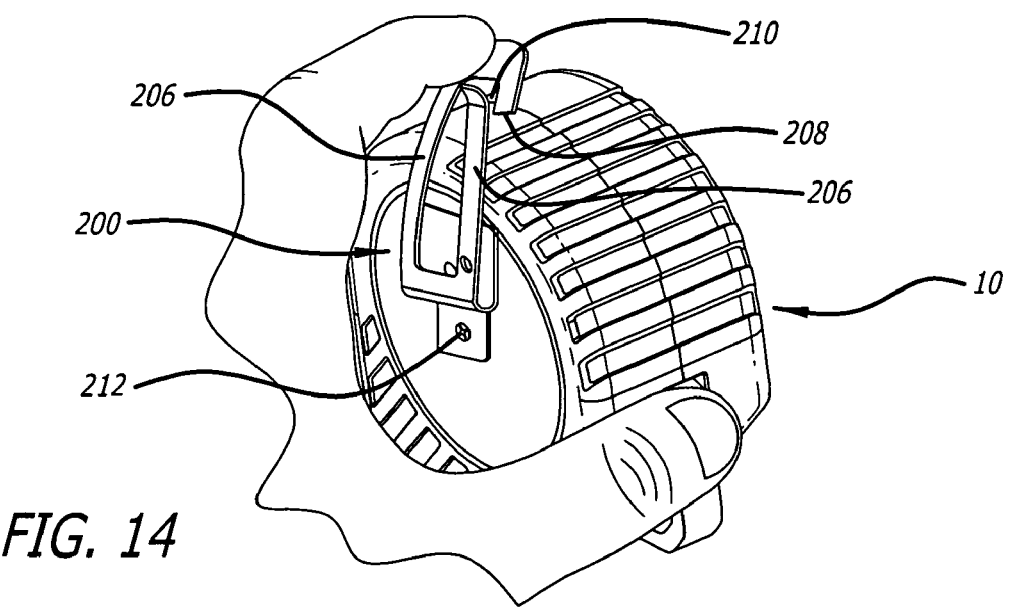
FIG. 14

RULE ASSEMBLY

FIELD OF THE INVENTION

The present invention is directed generally to tape measures or rule assemblies, and more particularly to power return rule assembly and housings therefor.

BACKGROUND OF THE INVENTION

Modern tape measures (or "rule assemblies") typically include a blade coiled upon a reel that is spring-biased towards a retracted position. A housing generally surrounds and protects the reel with its blade and a retraction spring. The housing includes an opening through which a distal end of the blade extends. Typically, the tape measure housing consists of two housing halves that are joined together by one or more screws. In addition, the housing typically includes a post extending across the midpoint of the housing that provides an anchoring point for one end of the retraction spring, and provides an axle around which the reel may rotate.

In order to conveniently store the tape measure when not in use, a clip is typically provided on the side of the housing and is configured to allow the user to clip the tape measure to his belt. However in some circumstances, for example where the width, and hence the weight, of the tape measure is substantial, a clip on the side of the housing may have the problem that the weight of the tape measure is positioned some distance outward from the point of support, thus allowing the tape measure to rotate downwards to twist off the belt. Some solutions to improved methods for attaching a tape measure to a point of support have been developed, as for example disclosed in U.S. Pat. No. 5,038,985, U.S. Pat. No. 5,388,741, and U.S. Pat. No. 5,450,994.

In another aspect of typical modern tape measures, the fact that the blade is coiled upon a reel by a retraction spring may frequently give rise to problems. First, if the blade is allowed too much movement within the housing as the blade uncoils or recoils, it may have a tendency to become misaligned and hence to become stuck, leaving the blade partway extended from the housing and rendering the tape measure effectively useless. Second, dirt or other foreign matter adhering to the blade may find its way into the housing when the blade is recoiled. This also may cause the reel to jam during retraction. When this occurs, the housing must typically be opened to inspect its interior to determine and resolve the cause of the blockage. However, if it is possible to determine the cause of the blockage without opening the housing, the problem may be solved by means other than opening the housing, such as by pulling out the entire length of the blade and letting it wind back into the housing under control.

Accordingly, there remains a need for improved tape measure housing designs, particularly those that have a more suitable and robust structure for attaching tape measures to the clothing or equipment of a user. There also remains a need for improved tape measure housing designs that permit a user to make a preliminary determination, when the retraction mechanism becomes jammed, as to the cause thereof.

SUMMARY OF THE INVENTION

According to a preferred embodiment of the invention, there is described an improved rule assembly that may be conveniently stored by the user when not in use. To overcome the shortcomings of a conventional clip system for suspending a rule assembly when not in use, a system and method is described for conveniently attaching a rule assembly to the clothing or equipment of a user. In this aspect of the invention, the rule assembly includes a housing that defines an interior and an exterior. Within the interior of the housing is positioned a reel, rotatably mounted and supporting an extendable blade. A beam is provided, having a first and second ends. The beam is attached to the housing at the first end and at the second end to form a space between the beam and the housing. The space is sufficient to receive a retention element, such as a carabiner, a hook, a piece of rope, clothing, or webbing of the user for supporting the weight of the rule assembly.

In a preferred embodiment, the beam may pivot at a first end, and be attachable to the housing at a second end. In this embodiment, the beam may be first detached from the housing at the second end, pivoted outward about the first end, and the second end may be threaded through a closed loop of fabric, or through and eye hook. Upon being so threaded, the second end may be attached again to the housing my means of a locking system, thus usefully ensuring that the rule assembly cannot inadvertently fall from its position of support.

Preferably, the locking system includes a slidable tab mounted in the housing that is urged from an open position to a locking position by a spring. Upon retraction of the tab against the bias of the spring, the tab releases the second end of the beam, permitting the beam to pivot outwardly about the first end. When it is desired to attach the second end of the beam to the housing, the beam may be pressed against the tab to force the tab to retract, thereby permitting the beam to relocate to its closed position. Upon reaching this position, the spring may automatically urge the tab back into its locking position.

In another aspect of the invention, a rule assembly is described that provides a novel structure permitting a user to make a preliminary determination as to the cause of any malfunction taking place within the interior of the rule assembly housing. The rule assembly includes a reel positioned interior the housing, upon which a tape or blade may be wound. Furthermore, a linear leaf spring may be wound on the reel, positioned diametrically interior to the position of the blade on the reel. At least one opening or window is formed on a lateral portion of the reel. A lateral wall of the rule assembly housing also includes an opening or window, the window being sealed by a transparent material.

The windows in the housing and in the reel are configured so that when the reel is rotated, the user may look into the interior of the housing through the transparent material, and through the window into the reel. In one embodiment, there may be a single opening in the reel, the opening being positioned to provide a view onto either the blade or onto the spring. In another embodiment, a plurality of openings may be provided on the reel to provide a view onto both the tape and onto the spring. By providing such viewing means to the interior of the rule assembly housing, the user may make a preliminary determination as to the cause of any malfunction in the working of the rule assembly, thereby allowing the appropriate corrective action to be taken.

These and other advantages of the invention will become more apparent from the following detailed description thereof and the accompanying exemplary drawings.

BRIEF DESCRIPTION OF THE DRAWINGS

FIG. 12 is an elevational view of another embodiment of a rule assembly having features of the present invention, showing a clip-on feature.

FIG. 13 is an elevational view of the rule assembly of FIG. 12, in another configuration.

FIG. 14 is an elevational view of the rule assembly of FIGS. 12 and 13, in yet another configuration.

DETAILED DESCRIPTION OF THE PREFERRED EMBODIMENTS

Figure 1:
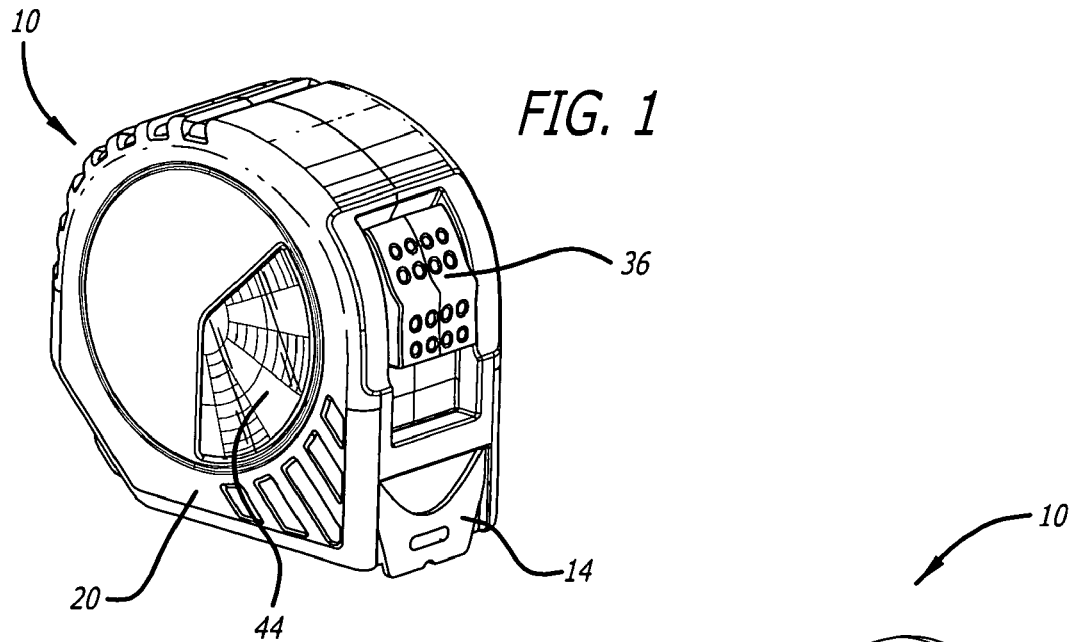
FIG. 1 is a perspective view from the front of a rule assembly having features of the present invention.
Figure 2:
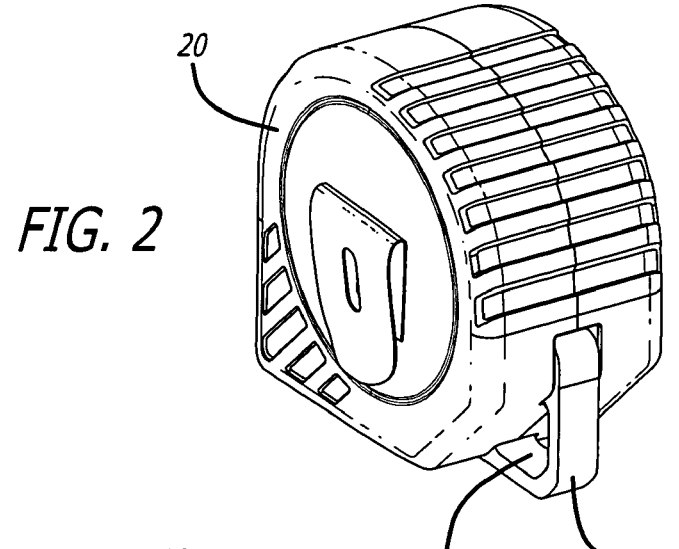
FIG. 2 is a perspective view from the rear of the rule assembly of FIG. 1.
Figure 3:
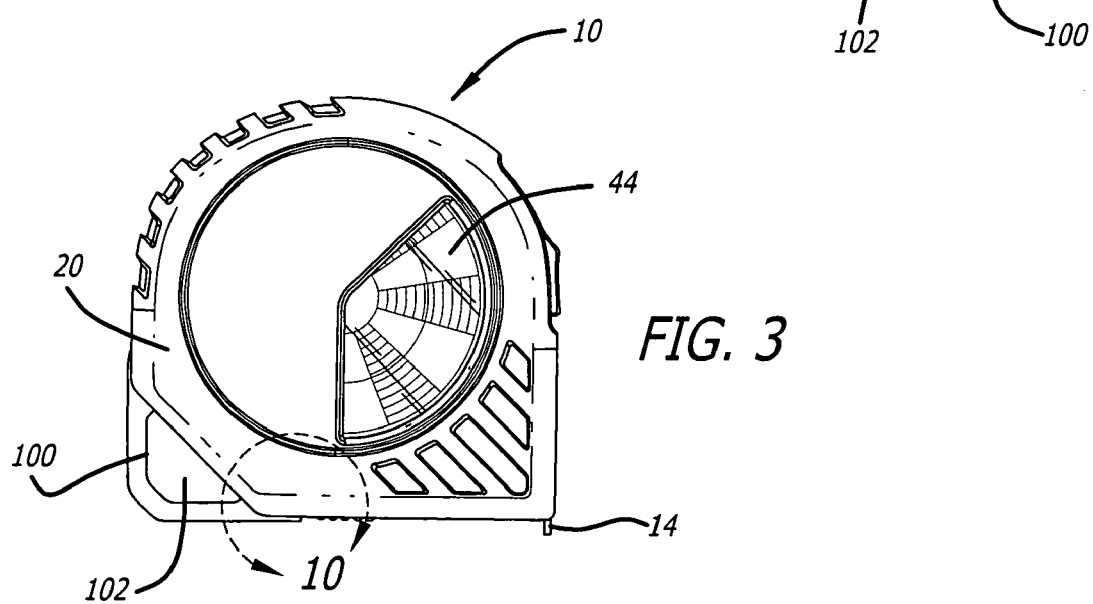
FIG. 3 is a side elevational view of the rule assembly of the FIG. 1.

With reference to the figures, a tape measure, generally designated 10, is shown having features of the present invention. The tape measure 10 includes a coilable measuring tape or blade 12 (FIGS. 6-9) positionable within a housing 20. The distal end of the tape 12 may include an end hook 14 to facilitate snagging on a remote object whose distance from the tape is to be measured, and also to prevent the blade from being retracted into the housing 20. Advantageously, the blade 12 may be coiled or wound onto a rotatable reel 22 to facilitate the blade being withdrawn from, and retracted back into, the housing 20.

A locking mechanism, including a toggle 36 or similar actuator is provided to aid in controlling the movement of the tape 12 into and out of the housing 20.

A tape-biasing device, such as a retraction spring 24 (FIG. 7), is operatively connected to the tape 12 to bias it towards a retracted orientation. Advantageously, the retraction spring 24 may be a linear leaf spring, coiled onto the reel 22 inside the coiled diameter of the blade 12, as exemplified in FIGS. 7-9. Thus, when the blade 12 is retracted from the housing, this action adds to the number of coils of the retraction spring 24, and reduces the overall diameter of the retraction spring. When the blade is released the retraction spring flexes to its original larger diameter by uncoiling and thereby recoils the blade, urging the blade back into the housing.

Figure 7:
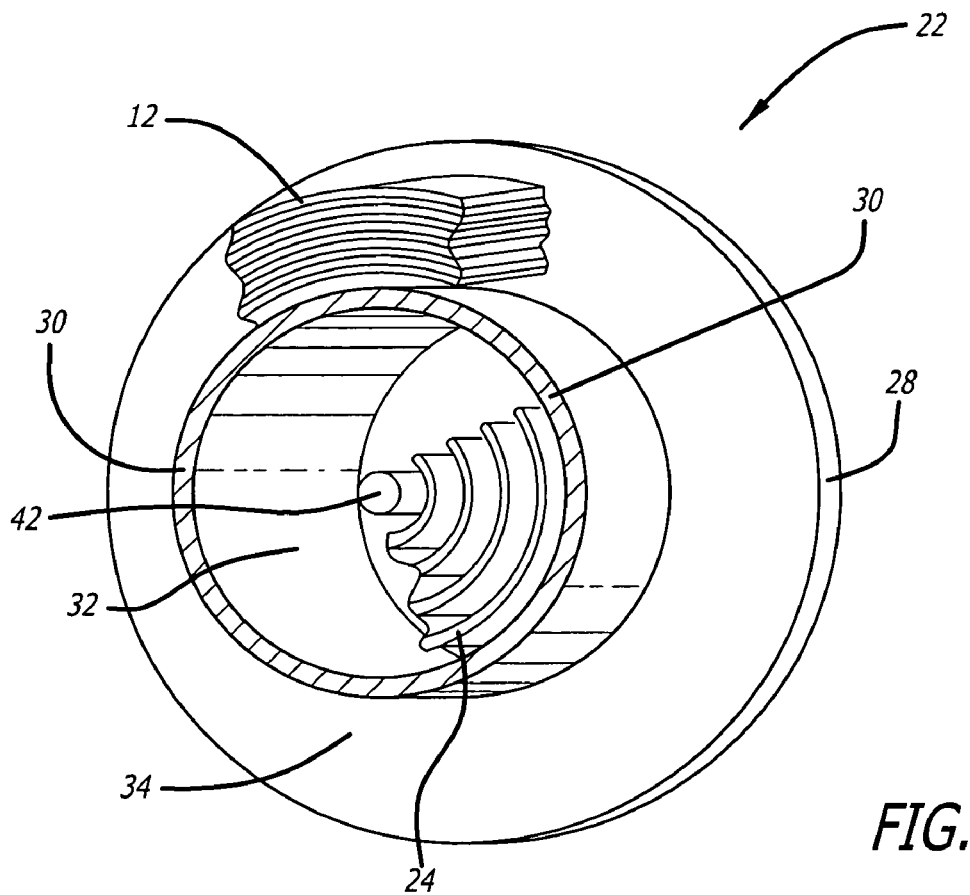
FIG. 7 is a fragmented view in perspective of a reel included within a rule assembly having features of the present invention.

In a preferred embodiment, the reel has at least one but preferably two side walls 26, 28 and a circumferential separation element 30 between the side walls configured to maintain the retraction spring in a separate compartment of the reel from the blade. Thus, the separation element 30 and side walls define a retraction spring compartment 32 and a blade compartment 34 (FIG. 7). Maintaining the space in which the spring 24 operates separate from the space in which the blade 12 operates inside the housing advantageously reduces the overall movement of the blade and the spring when the blade is withdrawn from the housing. This reduces the possibility of the tape or retraction spring becoming misaligned, and therefore reduces the possibility of the reel 22 becoming jammed. Further inventive aspects of the reel are described below.

The housing 20 may be constructed from two portions, a right-hand portion 38 and a left-hand portion 40 (FIG. 6), joined together by suitable screws, as is known in the art. The external configurations of both the housing portions 38, 40 may advantageously be symmetrical if desired, but this is not required. Indeed, the two portions 38, 40 may have different internal and external configurations, depending on the internal workings of the tape measure 10, also as is known in the art.

Figure 6:
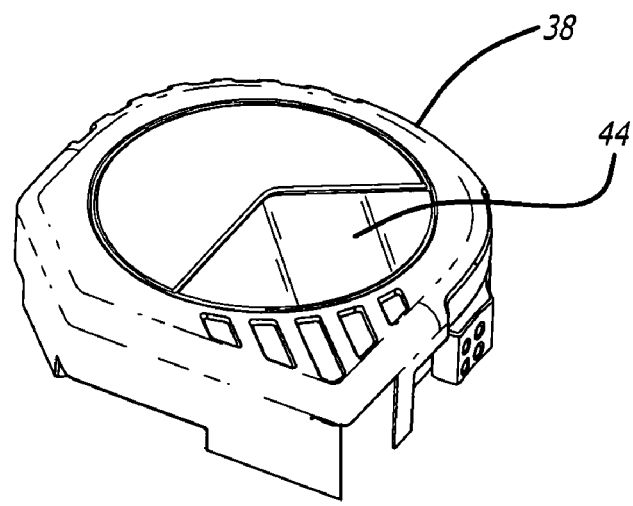
FIG. 6 is an exploded view of a rule assembly having features of the present invention.
Figure 6:
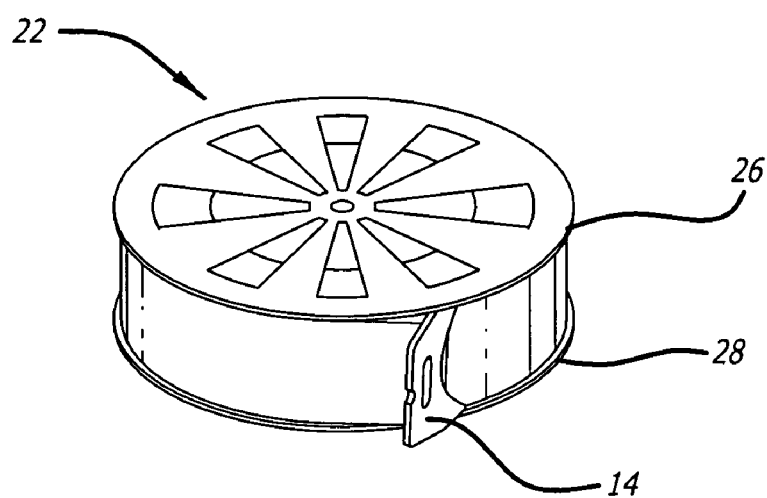
Figure 6:
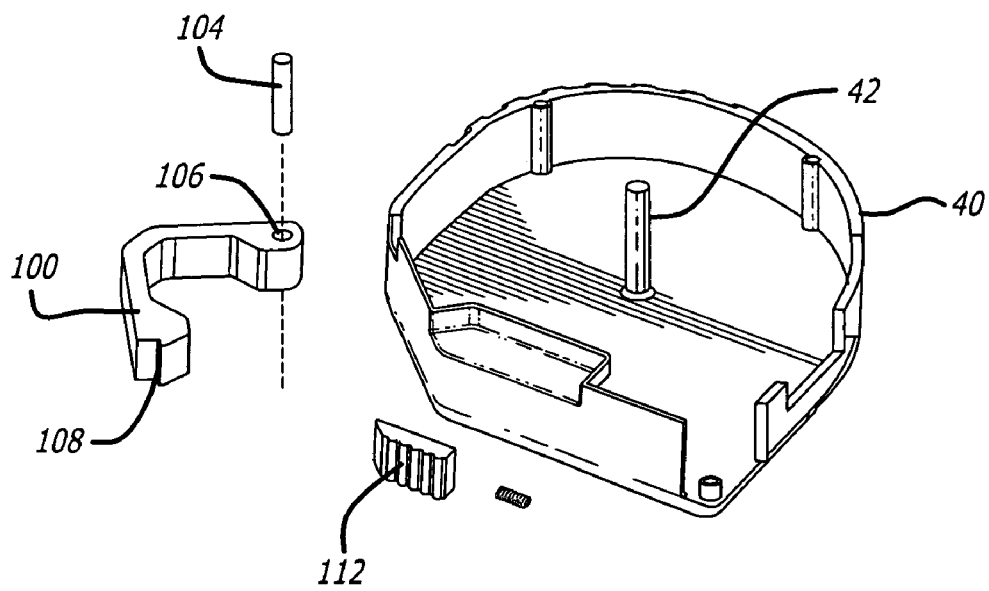
Figure 8:
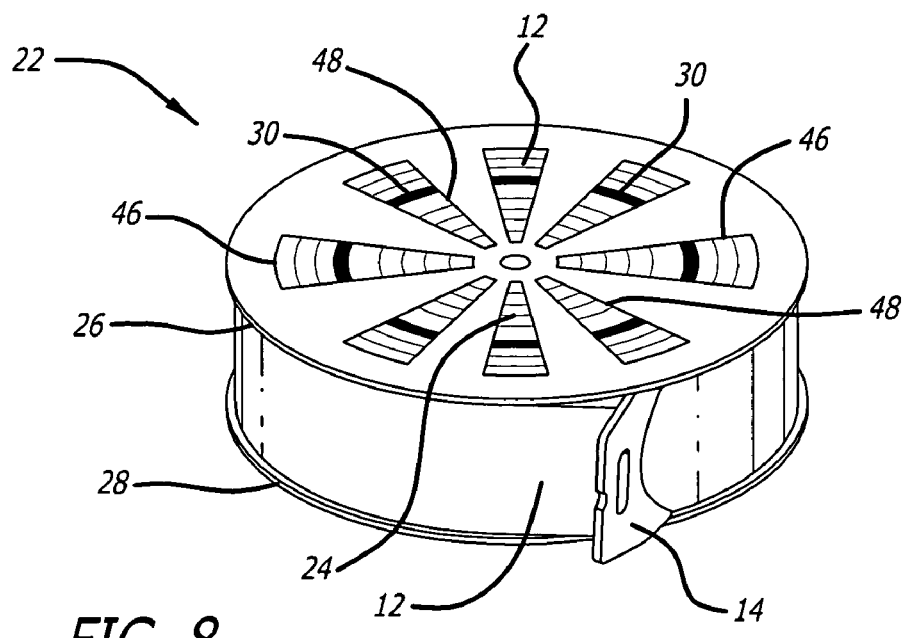
FIG. 8 is a perspective view of a reel included within a rule assembly having features of the present invention.
Figure 9:
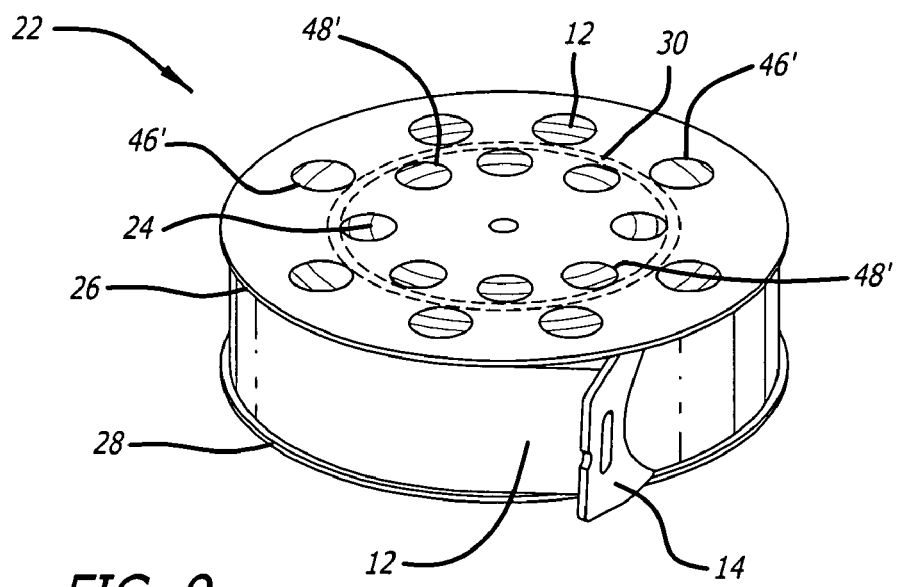
FIG. 9 is a perspective view of an alternative embodiment of a reel included within a rule assembly having features of the present invention.

A post 42 may be disposed between the respective housing portions 38, 40 internal to the housing (FIGS. 6-8). The post 42 advantageously may provide both an axle for rotation of the reel 22, and a point of connection for the retraction spring 24. Preferably, the post may be supported at its ends by ball bearings (not shown) mounted in each housing portion 38, 40.

In one aspect of the invention, at least one of the left or right side housing portions includes a transparent panel 44, made of rigid transparent material. This transparent panel permits a view from the exterior of the housing 20 into the interior of the housing and onto inner elements of the rule assembly, particularly onto the reel 22. Furthermore, the reel 22 onto which the blade 12 and the spring 24 are wound has at least one, preferably a plurality, of lateral openings. These openings may be blade openings 46, which provide a lateral view through the reel into the blade compartment 34 and onto the coiled blade 12, or spring openings 48, which provide a lateral view through the reel into the spring compartment 32 onto the coiled spring 24. In a preferred embodiment, the openings 46, 48 may be shaped as portions of pie segments between radial projections, as exemplified in FIG. 8. In another aspect, openings 46', 48' may be circular, as exemplified in FIG. 9. These openings are configured to permit the user to look through the transparent panel, through the lateral openings, onto the blade 12, and/or onto the spring 24, as desired. Thus, in the event the spring or the blade misaligns to malfunction and binds up to prevent the proper retraction of the blade into the housing 20, the user may view inside the housing to make a preliminary determination as to the problem, without opening the housing. Early detection of the problem in this way may allow the user to determine whether the further step of opening the housing is necessary, or may save the user from undertaking that step.

In another aspect of the present invention, directed to a more robust means for removably attaching the tape measure to the clothing or equipment of a user, a beam 100 is attached to the housing of the tape measure, as exemplified in FIGS. 3-5 and FIGS. 10-11. The beam may be substantially straight, but in a preferred embodiment the beam is substantially curved, and together with the housing 20 defines an opening 102 through which a flexible or rigid body may be inserted to suspend the tape measure from a desirable location. Suitable structure to which the tape measure may be suspended may include a carabiner, a hook, a piece of rope, clothing, or webbing of the user.

Figure 4:
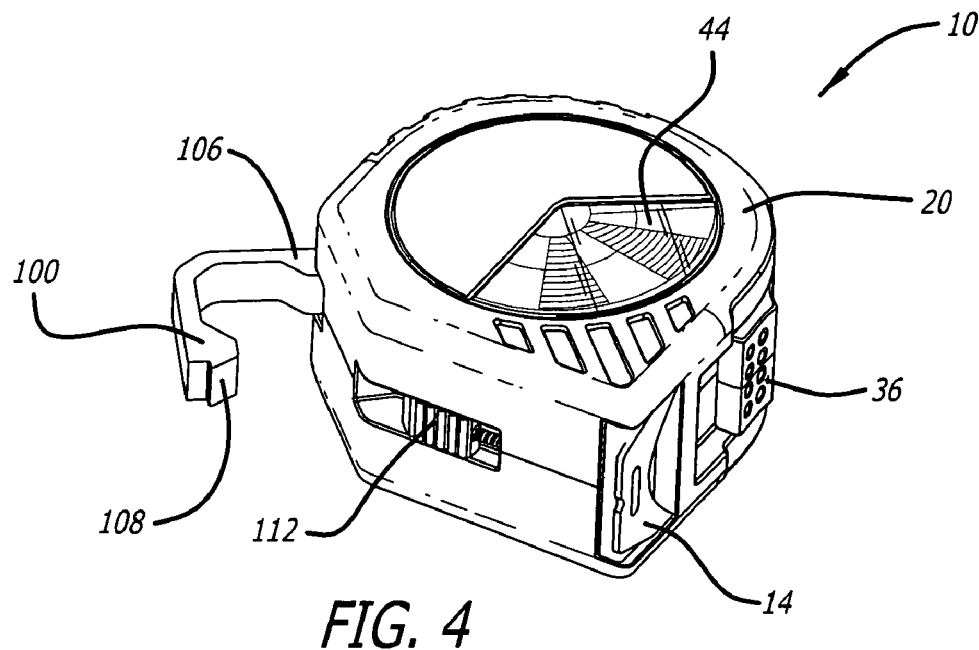
FIG. 4 is a perspective view from the bottom of a rule assembly having features of the present invention.
Figure 5:
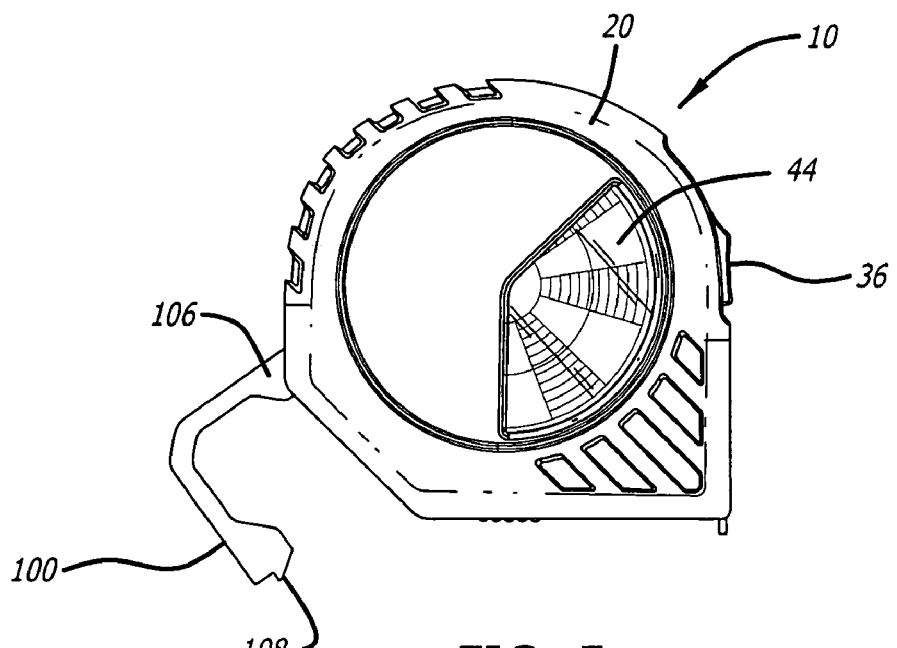
FIG. 5 is a side elevational view of the rule assembly of FIG. 4

In one aspect of the invention, the beam 100 may pivot about a securing pin 104 (seen in FIG. 6) at a proximal end 106 and be attachable to the housing at a distal end 108. Thus, when the distal end 108 is detached from the housing, the beam pivots outward (FIGS. 4-5) to release whatever retention structure has been inserted in the opening. In the case of a pivotable beam, suitable structure for suspending the tape may further include a closed fabric loop or an eye hook, because the open beam may be threaded through such structure before being locked at the distal end 108 to the housing 20.

Where the beam is pivotable, such as exemplified in FIGS. 4-6, a locking mechanism 110 is provided (FIGS. 10-11) by which the distal end 108 may be locked to the housing 20. The locking mechanism preferably includes a tab 112, or locking element, positioned partially within the housing 20. The tab is movable between a locked position (FIG. 10) and an open position (FIG. 11). A friction portion 114 of the tab 112 may protrude to the external surface of the housing to permit a user to slidingly engage the tab by finger. A locking spring 116 urges the tab toward the distal end 108 of the beam. When the beam is in the closed position, the tab is urged to ride over the distal end of the beam and is held in position by the locking spring 116.

In use, by retracting the tab 112 against the force of the locking spring 116, the user may unlock the distal end 108 of the beam, allowing the beam to pivot to an open position as exemplified in FIG. 11.

Figure 10:
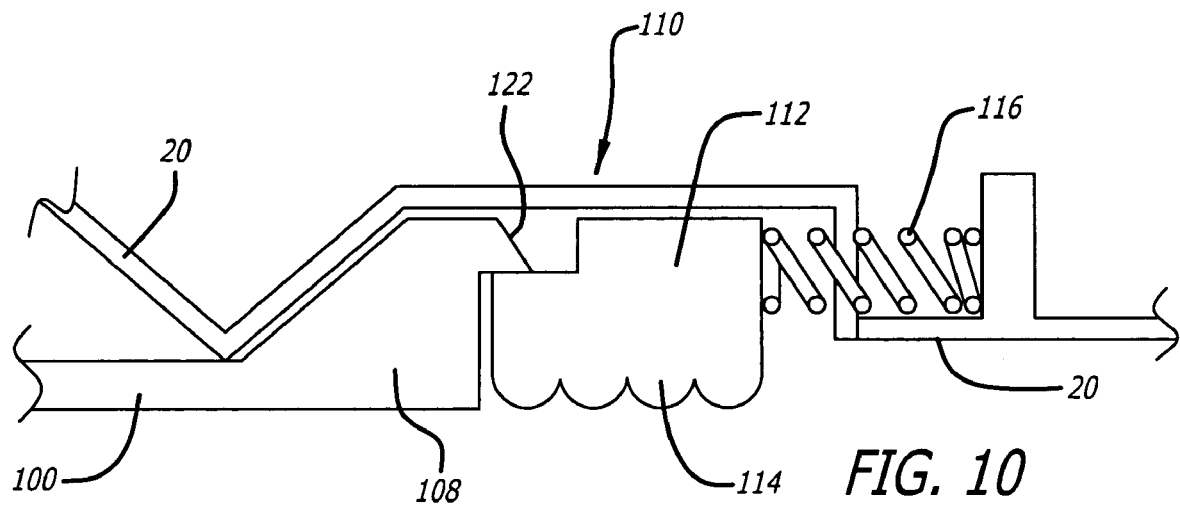
FIG. 10 is a schematic view of a locking assembly having features of the present invention, in a locking position.
Figure 11:
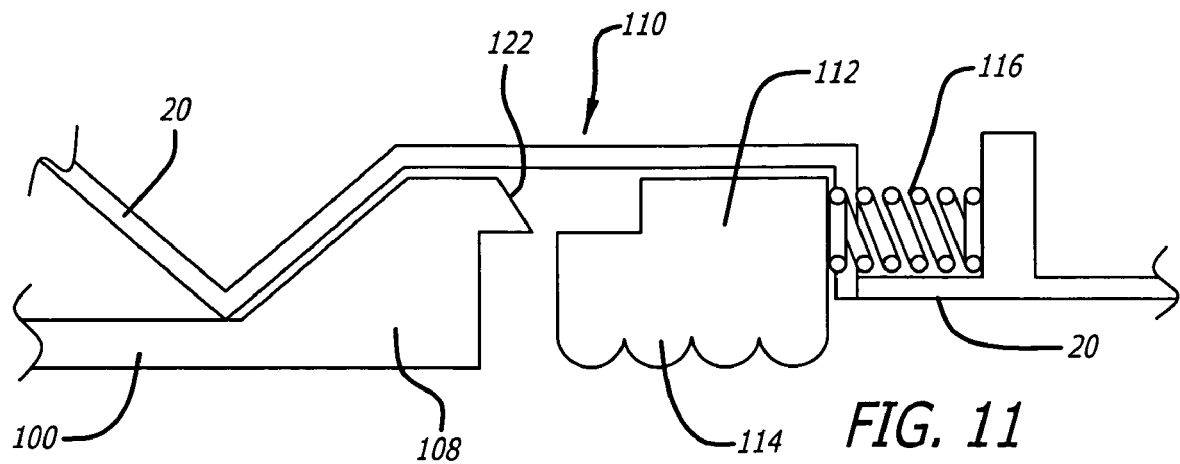
FIG. 11 is a schematic view of a locking assembly having features of the present invention, in an open position.

Another aspect of the locking mechanism, exemplified in FIG. 10-11 is that the distal end 108 of the beam 100 may present a sloping face 122 to the tab 112 so that, when the beam is pressed toward the closed position and thus against the tab, the tab may be forced to retract by this pressing action. Thus, the user may conveniently press the beam to snap into a locking position without having to additionally manipulate the tab.

With reference to FIGS. 12-14, there is disclosed yet another aspect of the invention, directed to a secure means for removably attaching the tape measure to the clothing or equipment of a user. A clip 200 is provided, and attached to the tape measure 10. The clip is resiliently elastic, optimally made of stainless steel, configured to return to its original shape after a deforming force is removed, and thus configured to removably affix the tape measure onto a belt or clothing of a user in the conventional way. However, the clip 200 may have additional advantageous novel features to facilitate affixing the tape measure to user's apparel or equipment. The clip 200 may be affixed to the tape 10 in such a way as to permit it to rotate from a first configuration where the clip overlays the tape measure as in FIG. 12, to a second configuration as in FIG. 13 where the clip protrudes, at least in part, beyond the profile of the housing of the tape measure to present an exposed closed eye 204 for easy suspension from an open hook, such as may found on webbing or equipment of the user. Such attachment permitting rotation may be achieved by a single screw 212 which has the uppermost portion of its shank without any thread, thus permitting the screw to be screwed into the tape measure, but permitting a short portion of the shank to support the clip 200, but with insufficient thread to frictionally tighten the clip onto the tape measure. Mating detents (not shown) may be added to the clip 200 and the tape measure 10 to rotationally stabilize the clip in closed and open conditions, as in FIGS. 12 and 13 respectively.

In yet another aspect, exemplified in FIGS. 13 and 14, the clip may include a pair of arms 206 defining the eye 204. One of the arms may have a discontinuity 208, configured to permit the user to temporarily deform the clip, as indicated in FIG. 14, to produce a space gap 210 in the arm sufficient to insert a portion of a closed loop, after which the arm may be permitted to elastically return to its original configuration, with no gap but securely attached to the loop so that the clip 200 cannot be removed from the loop without first deforming the arm of the clip again. Thus, the clip 200 may be removably attached to a closed suspension loop, whether the loop be made of metal, clothing, fabric, or other material. This configuration permits a highly secure means for suspending and storing the tape measure 10 while it is not in use. Optimally, the arm having the discontinuity may have overlapping portions, so that when the arm is in its undeformed condition, the space gap 210 is removed and there is little danger of the loop slipping off the clip.

The tape measure 10 may be assembled using mostly conventional techniques, with some modifications to take advantage of the novel aspects of the invention.

The present invention may, of course, be carried out in other specific ways than those herein set forth without departing from the essential characteristics of the invention. The present embodiments are, therefore, to be considered in all respects as illustrative and not restrictive, and all changes coming within the meaning and equivalency range of the appended claims are intended to be embraced therein.

I claim:

1. A rule assembly comprising:
   a housing;
   a reel rotatably mounted in the housing, the reel supporting an extendable blade; and
   a clip having two arms defining an opening for attaching the rule assembly to a point of suspension;
   wherein, the clip is configured to rotate in a plane parallel with and adjacent to a planar surface of the housing to a first position in which the opening does not extend in the direction of the plane beyond the planar surface of the housing, and to a second position in which the opening extends in the direction of the plane beyond the planar surface of the housing, the opening being configured to receive a retention element when the clip is in the second position.

2. The rule assembly of claim 1, wherein one of the arms has a discontinuity and is elastically deformable such that when a deforming force is applied, the said one arm permits movement from a first configuration to a second configuration, and when the force is removed, the said one arm returns to the first configuration; and
   wherein, the second configuration has a gap at the discontinuity for permitting attachment of the clip to a point of suspension.

* * * * *